(12) United States Patent
Torvalds et al.

(10) Patent No.: US 7,694,113 B1
(45) Date of Patent: *Apr. 6, 2010

(54) METHOD FOR TRANSLATING INSTRUCTIONS IN A SPECULATIVE MICROPROCESSOR

(76) Inventors: Linus Torvalds, 1050 Woodduck Ave., Santa Clara, CA (US) 95051; Robert Bedichek, 2951 South Ct., Palo Alto, CA (US) 94306; Stephen Johnson, 18769 Favre Ridge Rd., Los Gatos, CA (US) 95033

( * ) Notice: Subject to any disclaimer, the term of this patent is extended or adjusted under 35 U.S.C. 154(b) by 379 days.

This patent is subject to a terminal disclaimer.

(21) Appl. No.: 11/069,497

(22) Filed: Feb. 28, 2005

Related U.S. Application Data

(63) Continuation of application No. 09/417,980, filed on Oct. 13, 1999, now Pat. No. 6,990,658.

(51) Int. Cl.
G06F 9/00 (2006.01)
(52) U.S. Cl. ...................... 712/228; 712/218
(58) Field of Classification Search ............... 712/209, 712/227, 228, 235, 218; 703/26, 27; 717/138
See application file for complete search history.

(56) References Cited

U.S. PATENT DOCUMENTS 5,307,504 A * 4/1994 Robinson et al. ............ 712/41

5,428,786 A 6/1995 Sites

OTHER PUBLICATIONS

Antonio Gonzalez et al., Instruction Fetch Unit for Parallel Execution of Branch Instructions, 1989, ACM, p. 417.*
Ebcioglu et al.; "An Eight-Issue Tree-VLIW Processor for Dynamic Binary Translation"; 1998; IEEE.*
Souza et al.; "Dynamically Scheduling the Trace Produced During Program Execution into VLIW Instructions"; 1999; IEEE.*
Souza et al.; "Dynamically Scheduling the Trace Produced During Program Execution into VLIW instructions"; 1999; IEEE.*
RISC (Reduced Instruction Set Computer)—Free Computer Science Tutorials. http://www.laynetworks.com/RISC.html. Copyright 2000-2007 Lay Networks.

(Continued)

*Primary Examiner*—Niketa I Patel
*Assistant Examiner*—Benjamin P Geib

(57) ABSTRACT

A method for use by a host microprocessor which translates sequences of instructions from a target instruction set for a target processor to sequences of instructions for the host microprocessor including the steps of beginning execution of a speculative sequence of target instructions by committing state of the target processor and storing memory stores previously generated by execution at a point in the execution of instructions at which state of the target processor is known, executing the speculative sequence of host instructions until another point in the execution of target instructions at which state of the target processor is known, rolling back to last committed state of the target processor and discarding the memory stores generated by the speculative sequence of host instructions if execution fails, and beginning execution of a next sequence of target instructions if execution succeeds.

8 Claims, 2 Drawing Sheets

OTHER PUBLICATIONS

Speculative execution from Wikipedia, the free encyclopedia. http://en.wikipedia.org/wiki/Speculative_execution. Text available under the terms of GNU Free Documentation License.

Arm architecture from Wikipedia, the free encyclopedia. http://en.wikipedia.org/wiki/Arm_architecture. Text available under the terms of the GNU Free Documentation License.

Wen-Mei W. Hwa and Yale N. Patt, Checkpoint Repoari for Out of Order Execution Machines, 1987, Proceedings of the 14th Annual International Symposium on Computer Architecture.

Alberto Ferreira De Souza, Home Page, Retrieved Jan. 20, 2005, HTTP://www.inf.ufes.br/alberto/papers/desouza_rounce99a.pdf.

\* cited by examiner

KEY

= Single sequence of translated instructions

→

Ⓒ = Commit

METHOD FOR TRANSLATING INSTRUCTIONS IN A SPECULATIVE MICROPROCESSOR

RELATED APPLICATION

This application is a Continuation of commonly-owned U.S. patent application Ser. No. 09/417,980 filed Oct. 13, 1999 now U.S. Pat. No. 6,990,658, entitled "A Method for Translating Instructions in a Speculative Microprocessor Featuring Committing State" to Torvalds et al.

BACKGROUND OF THE INVENTION

1. Field of the Invention

This invention relates to computer systems and, more particularly, to methods for increasing the efficiency of operation of a microprocessor which dynamically translates instructions from a target to a host instruction set and speculates on translated branch operations.

2. History of the Prior Art

Recently, a new microprocessor was developed which combines a simple but fast host processor (called a "morph host") and software (referred to as "code morphing software") to execute application programs designed, for a processor (the "target processor") having an instruction set different than the morph host processor. The morph host processor executes the code morphing software which translates the target programs dynamically into morph host processor instructions which are able to accomplish the purpose of the original target software. As the target instructions are translated, the new host instructions are both executed and stored in a translation buffer where they may be accessed without further translation. Although the initial translation of a program is slow, once translated, many of the steps normally required by prior art hardware to execute a program are eliminated. The new microprocessor has demonstrated that a simple fast low-powered processor is able to execute translated "target" instructions at a rate equivalent to that of the "target" processor for which the programs were designed.

In order to be able to execute programs designed for other processors at a rapid rate, the morph host processor includes a number of hardware enhancements. One of these enhancements is a gated store buffer which holds memory stores generated as sequences of morph host instructions are executed. A second enhancement is a set of host registers which store state of the target processor at the beginning of any sequence of target instructions being translated. If the translated morph host instructions execute without raising an exception, the target state at the beginning of the sequence of instructions is updated to the target state at the point at which the sequence completed and the memory stores are committed to memory.

If an exception occurs during the execution of the sequence of host instructions which have been translated, processing stops; and the entire operation may be returned or rolled back to the beginning of the sequence of target instructions at which known state of the target processor exists. This allows very rapid and accurate handling of exceptions while dynamically translating and executing instructions.

It will be noted that the method by which the new microprocessor handles the execution of translations by placing the effects in temporary storage until execution has been completed successfully is effectively a rapid method of speculating. The new microprocessor, in fact, uses the same circuitry for speculating on the outcome of other operations. For example, by temporarily holding the results of execution of sequences of instructions reordered by a software scheduler from naively translated sequences of instructions, more aggressive reordering may be accomplished than has been attempted by the prior art. When such a reordered sequence of instructions executes to produce a correct result, the memory stores resulting from execution of the reordered sequence may be committed to memory and target state may be updated. If the reordered sequence generates an exception while executing, then the state of the processor may be rolled back to target state at the beginning of the sequence and a more conservative approach taken in translating the sequence.

One of the most advantageous features of the new microprocessor is its ability to link together short sequences of target instructions which have been translated and found to execute without exception to form longer sequences of instructions. This allows a translated program to be executed at great speed because the microprocessor need not look up each of the shorter translated sequences or go through all of the steps normally taken by hardware processors to execute instructions. Even more speed may be attained than might be expected because, once long sequences are linked, it is often possible for an optimizer to eliminate many of the steps without changing the results produced. Hardware optimizers have never been able to optimize sequences of instructions long enough to allow the patterns which allow significant optimization to become apparent (such as loops).

The original method of speculation used by the new processor always updates the state of the target processor by committing stores to memory from the gated store buffer and transferring new state to target registers at the end of a sequence of instructions which had executed correctly and before any next sequence of target instructions was translated. This method of updating state is effective for many situations.

However, there are certain characteristics of the method which are less useful in certain circumstances. First, it is usually desirable to execute sequences which are as long as possible. In order to obtain long sequences of instructions between commits, it is often necessary to include one or more branch instructions which are not immediately followed by a commit instruction. This may occur when the code morphing software sees that a branch is taken almost all of the time and decides to treat the branch usually taken as the normal path for execution. The code morphing software speculates that this is the path which will be taken and omits a commit instruction after the branch instruction in order to provide longer sequences which may be further optimized. However, since there are no commit instructions immediately following each internal branch instruction at which the state of the target processor is committed before a branch is taken, if an exception occurs at some point during the execution of the sequence after an internal branch is taken, the operation of the machine must be rolled back to the beginning of the initial sequence preceding the branch instruction which is the last point at which correct state of the target processor exists. This may be quite time consuming.

Second, the original method of committing stores to memory while speculating on sequences of host instructions is useful because it is desirable to create translations which are as long as possible in order to accelerate execution. However, sequences of instructions can result from the taking of branches within sequences not followed by commit instructions which are so long that the number of memory stores are too great for the finite length of the gated store buffer used to accomplish speculation. This causes execution to halt, rollback to occur, and shorter sequences of instructions to be generated, a process which slows execution.

Another problem caused by this original method of committing stores to memory at the end of translated sequences occurs in cases in which all of the steps of some portion of the sequence must be completed sequentially without interruption in order that the result desired be produced. Input/output operations are often an example of such sequences. In such cases, it is typical to lock out interrupts until the sequence is finished. However, the lockout must be released at the end of the sequence in order to realize the full benefits of optimization. However, an unlock cannot occur without a commit because any asynchronous interrupt which was attempted during the locked stages of the sequence but was delayed by the lock would be generated and cause execution to be rolled back to the last known correct state. This could cause operations such as input/output to be repeated which could violate symantics of the system.

It is desirable to improve provide a new method of translating sequences of instructions by which the speed of the new microprocessor is maintained or increased.

SUMMARY OF THE INVENTION

It is, therefore, an object of the present invention to accelerate execution by a microprocessor capable of running application programs designed for other microprocessors.

This and other objects of the present invention are realized by a method for use by a host microprocessor which translates, sequences of instructions from a target instruction set for a target processor to sequences of instructions for the host microprocessor comprising the steps of beginning execution of a first sequence of target instructions by committing state of the target processor and storing memory stores previously generated by execution at a point in the execution of target instructions at which state of the target processor is known, executing the speculative sequence of host instructions until another point in the execution of target instructions at which state of the target processor is known, rolling back to last committed state of the target processor and discarding memory stores resulting from the speculative sequence of host instructions if execution fails, and beginning execution of a next sequence of target instructions if execution succeeds by committing state of the target processor and storing memory stores previously generated.

These and other objects and features of the invention will be better understood by reference to the detailed description which follows taken together with the drawings in which like elements are referred to by like designations throughout the several views.

DETAILED DESCRIPTION

Figure 1:
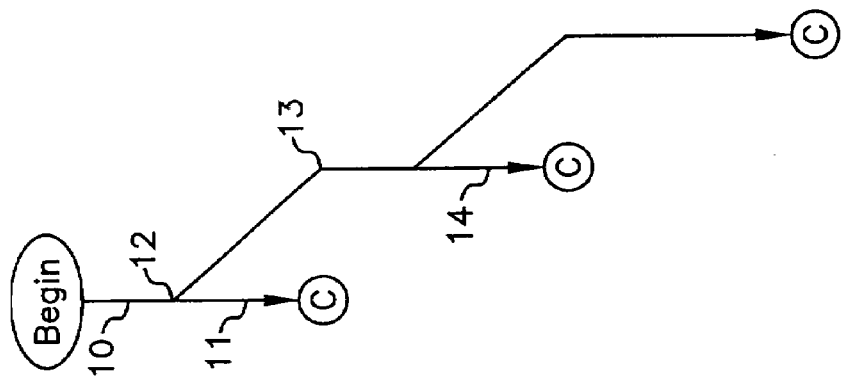
FIG. 1 is a diagram illustrating a method for translating instructions which has been practiced in previous versions of the new microprocessor.

Referring now to FIG. 1, there is illustrated a diagram describing the execution of a sequence of instructions. The key at the lower left of the figure provides definitions for portion of the figures. A straight line ending in an arrow represents a single sequence of translated instructions which is being executed. A circle represents a commit operation. As a sequence of instructions has typically been executed using the new microprocessor before the present invention, the sequence of instructions is executed from its beginning at point 10 and continuing to its end at point 11 at which a commit operation occurs. This is represented by the left uppermost sequence starting at "begin" and continuing straight down to a "commit." In executing such a short sequence, various state of the operation existing immediately prior to the "begin" point (which is a last point at which state of the target operation is known) is recorded. When the execution of the sequence concludes at the commit operation just beyond point 11, the necessary state of the operation at the commit point is saved.

If, in a short sequence of instructions including a branch operation, the branch occurs at the end of the sequence, proper state of the target processor is committed just before the execution of the branch sequence occurs. Consequently, an exception occurring in either branch has the effect of rolling the operation back to the commit point where correct state exists immediately before execution of the branch sequence commences.

However, it is possible that in the sequence of target instructions execution of a branch operation will commerce without a commit operation. For example, the translation and optimization software may speculate that one branch will almost always be taken and consider that direction as the normal direction of the sequence of instructions. In such a case, the software may create a sequence in which the state existing at an exit point is not committed. The sequence to the upper left in the figure beginning at point 10 and providing a branch at point 12 to a second sequence is such a sequence. In such a sequence, no commit operation occurs before the branch because the translation software determines that the sequence from point 10 to point 11 will probably usually be executed and omits the commit in order to accelerate execution.

When a sequence includes a branch operation which is taken in such a case, execution branches to the second sequence without a commit operation at the branch, and the branch sequence commences executing at its beginning instruction (e.g., point 13). The earliest possible point at which a commit may occur is at the conclusion of the branch sequence at point 14. Even this commit will not occur if the branch sequence also includes a branch operation before its end which branch is taken (as in the third sequence to the far right in FIG. 1). As may be seen, this offers the possibility of sequences of translations which are of unbounded length before a commit occurs.

Because the translation path may thus be too long between commit points if branches are taken at intermediate points in execution sequences, the number of memory stores which have not yet been committed may be too large when a commit point is finally reached. In fact, the number of executed store instructions may be larger than there is room for storage in the gated store buffer. If this occurs, provision must be made to assure that data will not be lost. Consequently, it has been necessary for the translator and optimizer to be more conservative in placing branches in the middle of sequences of translations. This has effectively produced optimized code which executes more slowly.

A second problem created by the old process is that if a number of branches are taken in a sequence of instructions being executed at points at which target state is uncommitted and a failure occurs during execution at some point after a large number of instructions have been executed, then a great deal of time will have been wasted in executing instructions before rolling back to the last point at which a commit occurred and then retranslating from that point.

Another problem caused by this original method of committing stores to memory at the end of translated sequences occurs in cases in which all of the steps of some portion of the sequence must be completed sequentially without interruption in order that the result desired be produced. Input/output operations are often an example of such sequences. In such cases, it is typical to lock out interrupts until the sequence is finished. However, the lockout must be released at the end of the sequence in order to realize the full benefits of optimization. However, an unlock cannot occur without a commit because any asynchronous interrupt which was attempted during the locked stages of the sequence but was delayed by the lock would be generated and cause execution to be rolled back to the last known correct state. This could cause operations such as input/output to be repeated which could violate symantics of the system.

Figure 2:
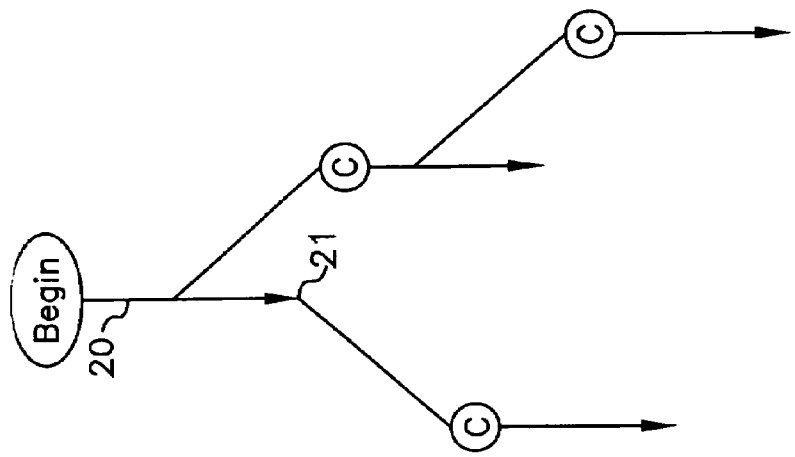
FIG. 2 is a diagram illustrating a method for translating instructions practiced in the new microprocessor in accordance with the present invention.

The present invention obviates these problems of the original process. FIG. 2 illustrates a linked set of sequences of translations utilizing the process of the present invention. In this new process, at the beginning of a new sequence before any execution of target instructions has taken place, a commit instruction stores the present state of the operation any memory stores generated by previous correctly-executed sequences of translated instructions. Thus, when an earlier sequence includes a branch instruction, if that branch is taken to a new sequence of instructions, then the new sequence of instructions begins with a commit operation. If the branch is not taken, the sequence continues to its end at which state of the target processor is known. At this point, execution of a new sequence commences beginning with a commit operation which commits the known state and stores the memory stores generated by execution of the previous sequence.

The new process produces a correct result. The state of the target processor which exists after the sequence of instructions ending at the branch point is committed after the decision on the branch to be taken and just prior to beginning the execution of the next sequence of translated instructions. To have arrived at a new sequence of instructions to be translated following the branch, the preceding sequence of instructions must have been executed without error by the new microprocessor. If the preceding sequence of instructions had not executed correctly, then the attempt to execute would have generated an interrupt causing a rollback; and the host would not be at the branch to begin translating instructions of the branch sequence. Consequently, correct execution of the translated instructions has occurred, and the new target state and memory stores generated by execution may be committed.

The new process has a number of benefits. First, the length of any sequence of stores which occurs between commit points can only be as long as the longest individual sequence of instructions in a single translation from the initial point at which the last commit occurred (e.g., point 20 to point 21 in FIG. 2). Thus the sequence of stores is bounded. This allows close control over the number of uncommitted stores which may reside in the gated store buffer so that overflow of the store buffer is rare.

Second, since a commit occurs whenever a branch is taken at the beginning of execution of the next sequence of instructions following the branch, there are no uncommitted branch operations. Thus, if an exception occurs which necessitates a rollback operation after a branch is taken, the amount of work the processor has done which is discarded is limited. For example, the number of stores which must be discarded are limited in number. Thus the delay attendant on a rollback is significantly reduced.

Figure 3:
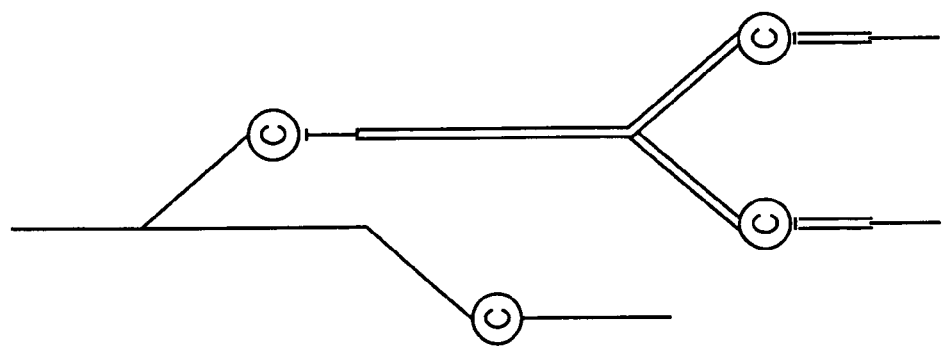
FIG. 3 is another diagram illustrating a method for translating instructions practiced in the new microprocessor in accordance with the present invention.

The new process also allows a locking operation to be started and released without generating an undesirable rollback operation or extending the processing mode under the lock for an indefinite period. FIG. 3 illustrates a number of sequences of translated instructions which include a portion in which a set of instructions must be carried out under a lock in order to execute correctly. In order to initiate the lock, the translator generates a locking instruction. From this point until the sequence reaches a branch instruction, the process translates instructions in sequential order without reordering or optimization (other than such as might have been tested before the lock began). At the branch where the process should be released from the lock, one of the branches is taken. After the branch is taken, whichever path is followed, a commit occurs when the new sequence begins to execute. The commit operation saves the known state at the point of the commit so that a rollback does not discard a correct translation. Then, the selected branch executes an unlock instruction to release the sequence from the need to execute instruction sequentially. Execution of the remainder of the branch sequence of instructions continues from that point.

In order to assure that an unlock occurs as soon as the sequence requiring a lock has completed, an indication of the lock state of the operation is stored with state at each commit. In one embodiment, this indication is a single bit which is stored in a context register of the host processor. This lock indication is determined at the beginning of the sequence and is indicative of the state which exists during the sequence. This lock indication is utilized with other state of the operation (including target state) to determine at the next commit point the sequence of instructions which is next to follow. That is, a next sequence must provide an unlock instruction for terminating the locked condition in order to qualify as a sequence which can occur next in order. Either of the branches which the execution can next execute should be of this form.

Figure 4:
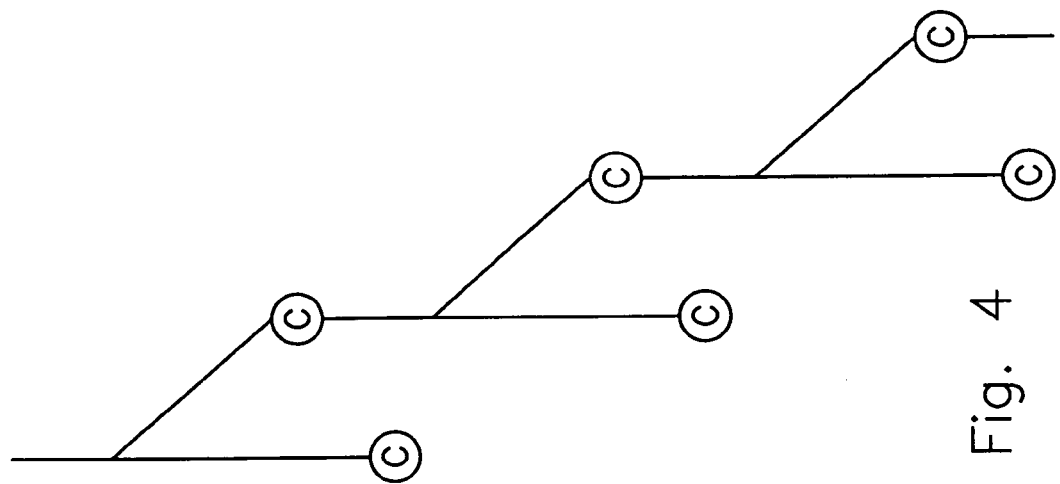
FIG. 4 is another diagram illustrating another method for translating instructions practiced in the new microprocessor in accordance with the present invention.

It is possible for other methods of processing than the preferred method to be utilized by combining aspects of the previous process and the preferred embodiment. For example, FIG. 4 illustrates a process which combines features of the two processes and provides certain advantages. The process illustrated utilizes commits which occur at the end of a sequence of instructions for sequences of instructions which include a locking operation. All other sequences of instructions commit at the beginning of an operation in the manner of this invention. A sequence of instructions which includes an uninterruptable portion usually requires that the instructions of the sequence be executed in order, which precludes most optimization. Thus, though the order of the sequence cannot be varied, additional commits may be added to the sequence because they do not vary the locked sequence. By placing a commit at the end of the sequence and then removing the lock, state relating to the lock may be contained within a single sequence of instructions. This has the advantage of allowing state for a sequence of translations to be treated as local for uninterruptable operations. The other translated sequences of operations are carried out in the manner described above with the effect described.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A method for use by a host microprocessor which translates sequences of instructions from a target instruction set for a target processor to sequences of instructions for the host microprocessor, said method comprising:
   in advance of executing a first sequence of target instructions, committing state of the target processor and storing memory stores generated by previously-executed sequences of instructions to produce a known state of the target processor,
   in advance of executing of a speculative sequence of host instructions following a branch from the first sequence of target instructions, committing state and storing memory stores of the host processor to a known state,
   executing the speculative sequence of host instructions until another point in the execution of target instructions at which state of the target processor is known, and
   rolling back to a last committed state of the target processor and discarding memory stores generated by the speculative sequence of host instructions if execution fails.

2. A method as claimed in claim 1 including an additional step of releasing a lock for any sequence of host instructions running in a locked condition after committing state of the target processor and storing memory stores generated by previously-executed translation sequences.

3. A method for use by a host microprocessor which translates sequences of instructions from a target instruction set for a target processor to sequences of instructions for the host microprocessor, said method comprising:
   in advance of executing a first sequence of target instructions, committing state of the target processor and storing memory stores generated by previously-executed sequences of instructions to produce a known state of the target processor,
   executing a sequence of host instructions from the first sequence of target instructions commencing after committing state of the target processor and storing memory stores previously generated by an execution until another point in the translation of target instructions at which state of the target processor is known,
   in advance of executing a next sequence of target instructions, committing state of the target processor and storing memory stores generated by the execution of the first sequence of target instructions at a point in the execution of target instructions at which that state is known, and
   executing a sequence of host instructions from the next sequence of target instructions commencing after committing state of the target processor and storing memory stores generated by the execution of the first sequence of target instructions until another point in the execution of target instructions at which state of the target processor is known.

4. A method for use by a host microprocessor which translates sequences of instructions from a target instruction set for a target processor to sequences of instructions for the host microprocessor, said method comprising:
   translating a first sequence of target instructions from a point in the translation of target instructions at which state of the target processor is known to produce a first speculative sequence of host instructions,
   ending the first sequence of target instructions in response to encountering a branch from the first sequence in the target instructions by:
      branching to a branch sequence of target instructions,
      committing state of the target processor and storing memory stores generated by the first speculative sequence after a branch taken before executing a branch sequence of host instructions, and
   ending execution of the first sequence of target instructions if a branch is not taken from the first sequence by:
      rolling back to last committed state of the target processor and discarding memory stores generated by the branch sequence of host instructions if execution fails, and
      committing state of the target processor and storing memory stores generated by the first sequence at the end of the sequence of target instructions at which state of the target processor is known.

5. A method for use by a host microprocessor for translating sequences of instructions from a target instruction set for a target processor to sequences of instructions for the host microprocessor, said method comprising:
   at said host microprocessor, in advance of executing a first sequence of target instructions, committing state of the target processor and storing memory stores generated by previously-executed sequences of instructions to produce a known state of the target processor,
   at said host microprocessor, in advance of executing a speculative sequence of host instructions following a branch from the first sequence of target instructions, committing state and storing memory stores,
   at said host microprocessor, executing the speculative sequence of host instructions until another point in the execution of target instructions at which state of the target processor is known, and
   at said host microprocessor, rolling back to last committed state of the target processor and discarding memory stores generated by the speculative sequence of host instructions if execution fails.

6. A method as claimed in claim 5 further comprising releasing a lock for any sequence of host instructions running in a locked condition after committing state of the target processor and storing memory stores generated by previously-executed translation sequences.

7. A method for use by a host microprocessor for translating sequences of instructions from a target instruction set for a target processor to sequences of instructions for the host microprocessor, said method comprising:
   at said host microprocessor, in advance of executing a first sequence of target instructions, committing state of the target processor and storing memory stores generated by previously-executed sequences of instructions to produce a known state of the target processor,
   at said host microprocessor, executing a sequence of host instructions from the first sequence of target instructions commencing after committing state of the target processor and storing memory stores previously generated by a execution until another point in the translation of target instructions at which state of the target processor is known,
   at said host microprocessor, in advance of executing a next sequence of target instructions by committing state of the target processor and storing memory stores generated by the execution of the first sequence of target instructions to produce a known state, and
   at said host microprocessor, executing a sequence of host instructions from the next sequence of target instructions commencing after committing state of the target processor and storing memory stores generated by the execution of the first sequence of target instructions until another point in the execution of target instructions at which state of the target processor is known.

8. A method for use by a host microprocessor for translating sequences of instructions from a target instruction set for a target processor to sequences of instructions for the host microprocessor, said method comprising:

at said host microprocessor, translating a first speculative sequence of host instructions from the first sequence of target instructions from a point in the translation of target instructions at which state of the target processor is known, at said host microprocessor, ending the first sequence of target instructions in response to encountering a branch from the first sequence in the target program by:

branching to a branch sequence of target instructions, and committing state of the target processor and storing memory stores generated by the first translation sequence after a branch taken before executing a branch sequence of host instructions, and at said host microprocessor, ending execution of the first sequence of target instructions if a branch is not taken from the first sequence by:

rolling back to last committed state of the target processor and discarding memory stores generated by the speculative sequence of host instructions if execution fails, and committing state of the target processor and storing memory stores generated by the first sequence at the end of the sequence of target instructions at which state of the target processor is known.

\* \* \* \* \*